United States Patent
Baskin

(10) Patent No.: US 11,002,309 B2
(45) Date of Patent: May 11, 2021

(54) HYBRID ROTOR SHAFT FOR A VERTICAL TAKE-OFF AND LANDING (VTOL) AIRCRAFT

(71) Applicant: Lockheed Martin Corporation, Bethesda, MD (US)

(72) Inventor: Bryan Kenneth Baskin, Arlington, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 315 days.

(21) Appl. No.: 16/051,146

(22) Filed: Jul. 31, 2018

(65) Prior Publication Data

US 2020/0040936 A1 Feb. 6, 2020

(51) Int. Cl.
*B64D 35/00* (2006.01)
*F16C 3/02* (2006.01)
*B64C 7/00* (2006.01)
*B64C 27/10* (2006.01)

(52) U.S. Cl.
CPC .............. *F16C 3/023* (2013.01); *B64C 7/00* (2013.01); *B64C 27/10* (2013.01); *B64D 35/00* (2013.01); *F16C 2202/06* (2013.01); *F16C 2206/02* (2013.01)

(58) Field of Classification Search
CPC .......... B64C 27/10; B64C 27/14; B64C 7/00; B64D 35/00; F16C 2202/06; F16C 2206/02; F16C 2326/43; F16C 3/023
USPC ........................................................ 244/60
See application file for complete search history.

(56) References Cited

U.S. PATENT DOCUMENTS

| | | | | |
|---|---|---|---|---|
| 9,415,568 | B2* | 8/2016 | Mizrahi | B32B 27/32 |
| 2010/0143147 | A1* | 6/2010 | Akhtar | F03D 1/0675 |
| | | | | 416/241 R |
| 2011/0210201 | A1* | 9/2011 | Fews | B64C 25/52 |
| | | | | 244/108 |
| 2012/0094777 | A1* | 4/2012 | Hechler-Stabbert | F02C 7/275 |
| | | | | 464/183 |
| 2015/0125299 | A1* | 5/2015 | Baskin | B64C 27/10 |
| | | | | 416/128 |
| 2015/0298803 | A1* | 10/2015 | Halcom | B64C 27/605 |
| | | | | 244/17.25 |
| 2016/0318605 | A1* | 11/2016 | Gmirya | B64C 27/12 |

OTHER PUBLICATIONS

Hosford, "Elementary Materials Science", 2013, ASM International, pp. 115-120 (Year: 2013).*

* cited by examiner

*Primary Examiner* — Claude J Brown
(74) *Attorney, Agent, or Firm* — Foley & Lardner LLP

(57) ABSTRACT

A rotor shaft for a vertical take-off and landing (VTOL) aircraft having a rotor system includes a body having a first end connectable to the rotor system, a second end, and an intermediate portion defining an outer surface and an inner surface extending between the first end and the second end. The body is formed from a first material. A stiffness enhancing layer is applied to one of the outer surface and the inner surface. The stiffness enhancing layer includes a second material other than the first material. The second material has a modulus of elasticity that is about 16E6 psi (116 GPa) or greater.

19 Claims, 2 Drawing Sheets

2

HYBRID ROTOR SHAFT FOR A VERTICAL TAKE-OFF AND LANDING (VTOL) AIRCRAFT

BACKGROUND

The subject matter disclosed herein generally relates to the art of air vehicles and, more particularly, to a hybrid rotor shaft for a vertical take-off and landing (VTOL) aircraft.

Vertical take-off and landing (VTOL) aircraft, such as rotary wing aircraft, a rotating wing in the form of rotary blades. The rotary blades may be connected to a rotor shaft through a rotor hub. The rotor shaft is connected to a prime mover, which may take on a variety of forms, through a gearbox. In operation, the rotor shaft is subjected to a number of forces including bending moments, and other strength-based structural criteria.

If increased bending stiffness is desired, the shaft may be formed from a higher modulus metal. Other methods of enhancing bending stiffness include increasing a cross sectional thickness of the rotor shaft. Both methods lead to an overall increase in rotor shaft weight which, in many systems, is undesirable. Accordingly, the industry would be open to a rotor shaft that meets strength based structural criterial along with having a desired bending moment capability without an appreciable increase in weight.

BRIEF DESCRIPTION

Disclosed is a rotor shaft for a vertical take-off and landing (VTOL) aircraft having a rotor system. The rotor shaft includes a body having a first end connectable to the rotor system, a second end, and an intermediate portion defining an outer surface and an inner surface extending between the first end and the second end. The body is formed from a first material. A stiffness enhancing layer is applied to one of the outer surface and the inner surface. The stiffness enhancing layer includes a second material other than the first material. The second material has a modulus of elasticity that is about 16E6 psi (116 GPa) or greater.

In addition to one or more of the features described above, or as an alternative, in further embodiments the first end defines a driven end of the rotor shaft.

In addition to one or more of the features described above, or as an alternative, in further embodiments the stiffness enhancing layer extends from about the second end toward the first end along the intermediate portion.

In addition to one or more of the features described above, or as an alternative, in further embodiments the stiffness enhancing layer extends from the about the second end to about the first end.

In addition to one or more of the features described above, or as an alternative, in further embodiments the stiffness enhancing layer is applied to the inner surface of the body.

In addition to one or more of the features described above, or as an alternative, in further embodiments the stiffness enhancing layer comprises one of graphite and boron.

In addition to one or more of the features described above, or as an alternative, in further embodiments the first end is supported by a first bearing and a second bearing, the stiffness enhancing layer extending along the inner surface between the first bearing and the second bearing.

In addition to one or more of the features described above, or as an alternative, in further embodiments the stiffness enhancing layer includes a non-uniform thickness extending from the first end toward the second end.

Also disclosed is a vertical take-off and landing (VTOL) aircraft including a fuselage, a prime mover supported in the fuselage, a gearbox connected to the prime mover, a rotor system which rotates rotor blades about an axis, and a rotor shaft assembly operatively connecting the rotor system and the gearbox. The rotor shaft assembly includes a body having a first end connected to the rotor system, a second end, and an intermediate portion defining an outer surface and an inner surface extending between the first end and the second end. The body is formed from a first material. A stiffness enhancing layer is applied to one of the outer surface and the inner surface. The stiffness enhancing layer includes a second material other than the first material. The second material has a modulus of elasticity that is about 16E6 psi (116 GPa) or greater.

In addition to one or more of the features described above, or as an alternative, in further embodiments the first end defines a driven end of the rotor shaft.

In addition to one or more of the features described above, or as an alternative, in further embodiments the stiffness enhancing layer extends from about the second end toward the first end along the intermediate portion.

In addition to one or more of the features described above, or as an alternative, in further embodiments the stiffness enhancing layer extends from the about the second end to about the first end.

In addition to one or more of the features described above, or as an alternative, in further embodiments the stiffness enhancing layer is applied to the inner surface of the body.

In addition to one or more of the features described above, or as an alternative, in further embodiments the stiffness enhancing layer comprises one of graphite and boron.

In addition to one or more of the features described above, or as an alternative, in further embodiments the first end is supported by a first bearing and a second bearing, the stiffness enhancing layer extending along the inner surface between the first bearing and the second bearing.

In addition to one or more of the features described above, or as an alternative, in further embodiments the stiffness enhancing layer includes a non-uniform thickness extending from the first end toward the second end.

In addition to one or more of the features described above, or as an alternative, in further embodiments the rotor system comprises a dual rotor system including a first plurality of rotor blades connected to a first rotor hub and a second plurality of rotor blades connected to a second rotor hub arranged axially upwardly of the first rotor hub.

In addition to one or more of the features described above, or as an alternative, in further embodiments the rotor shaft is connected to the second rotor hub.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
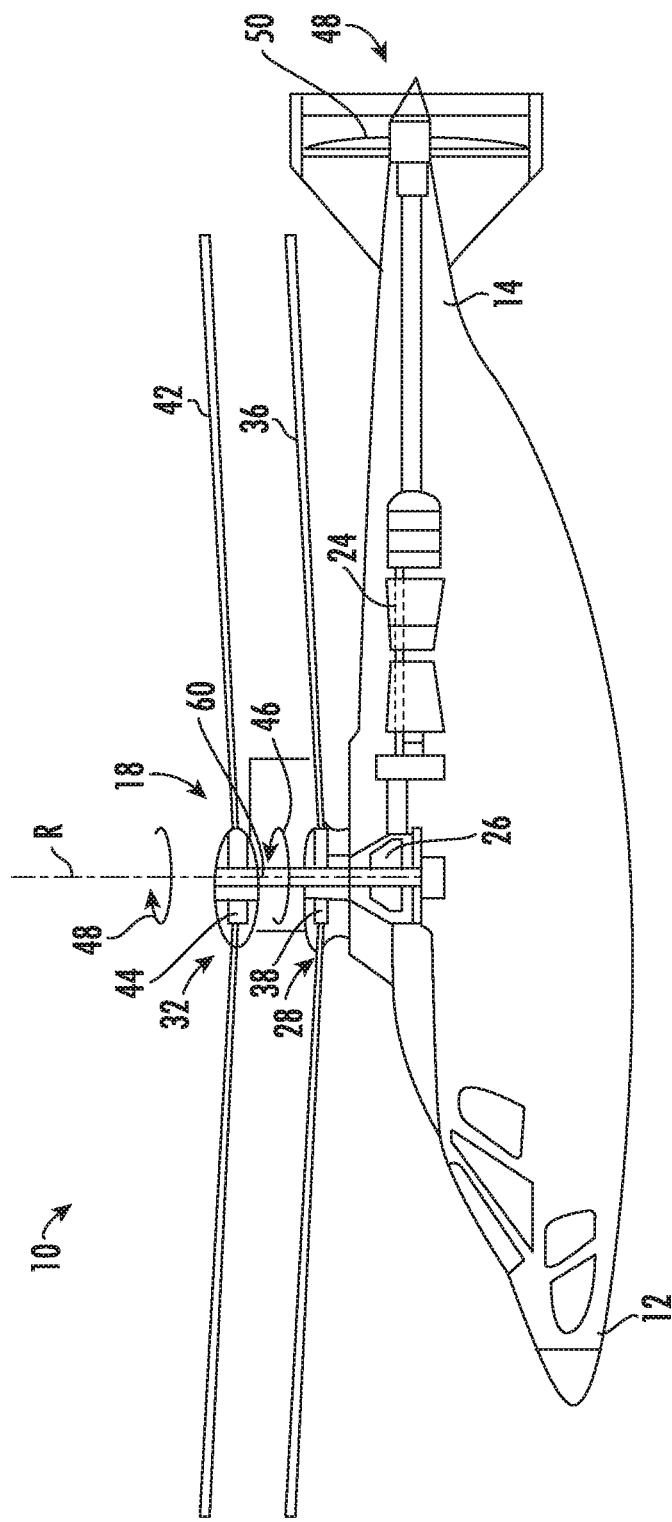
FIG. 1 depicts a rotary wing aircraft including a hybrid rotor shaft, in accordance with an exemplary embodiment.

Referring now to FIG. 1, vertical take-off and landing (VTOL) aircraft 10 is shown. VTOL aircraft 10 includes an airframe 12 with a longitudinally extending tail 14. Airframe 12 supports a coaxial contra-rotating rotor system 18 for rotation about a rotation axis R. One or more prime movers 24 are operably connected to coaxial contra-rotating rotor system 18 through a gearbox 26. Prime movers 24 drive gearbox 26 to rotate rotor system 18 about the axis of rotation R. Examples of prime movers 24 include turbo shaft engines, electric engines, reciprocating engines, or other engines used for aircraft.

Rotor system 18 includes a first rotor assembly 28 and a second rotor assembly 32. First rotor assembly 28 includes a first plurality of rotor blades 36 coupled to a first rotor hub 38. Second rotor assembly 32 includes a second plurality of rotor blades 42 coupled to a second rotor hub 44. First rotor assembly 28 may be driven in a first direction 46 about rotation axis R and second rotor assembly 32 in a second direction 48 about rotation axis R. Second direction 48 is opposite to first direction 46.

While FIG. 1 shows first direction 46 as being counter-clockwise direct and second direction 48 as being a clockwise direction about rotation axis R, it is to be understood and appreciated that in some embodiments the directions of rotation of the first rotor assembly 28 and second rotor assembly 32 may be reversed. It should also be understood that while shown as a co-axial system, rotor system 18 may include a single plurality of rotor blades 28, such as those used in non-coaxial rotor systems.

A translational thrust system 48 is located at an end of longitudinally extending tail 14 to provide translational thrust for VTOL aircraft 10. For example, translational thrust system 48 includes a propeller rotor 50 connected to and driven by the at least one engine 24 via gearbox 26. While shown in the context of a pusher-prop configuration, it is understood that the propeller rotor 50 could, as an alternative, be positioned to provide yaw control in addition to or instead of translational thrust.

Figure 2:
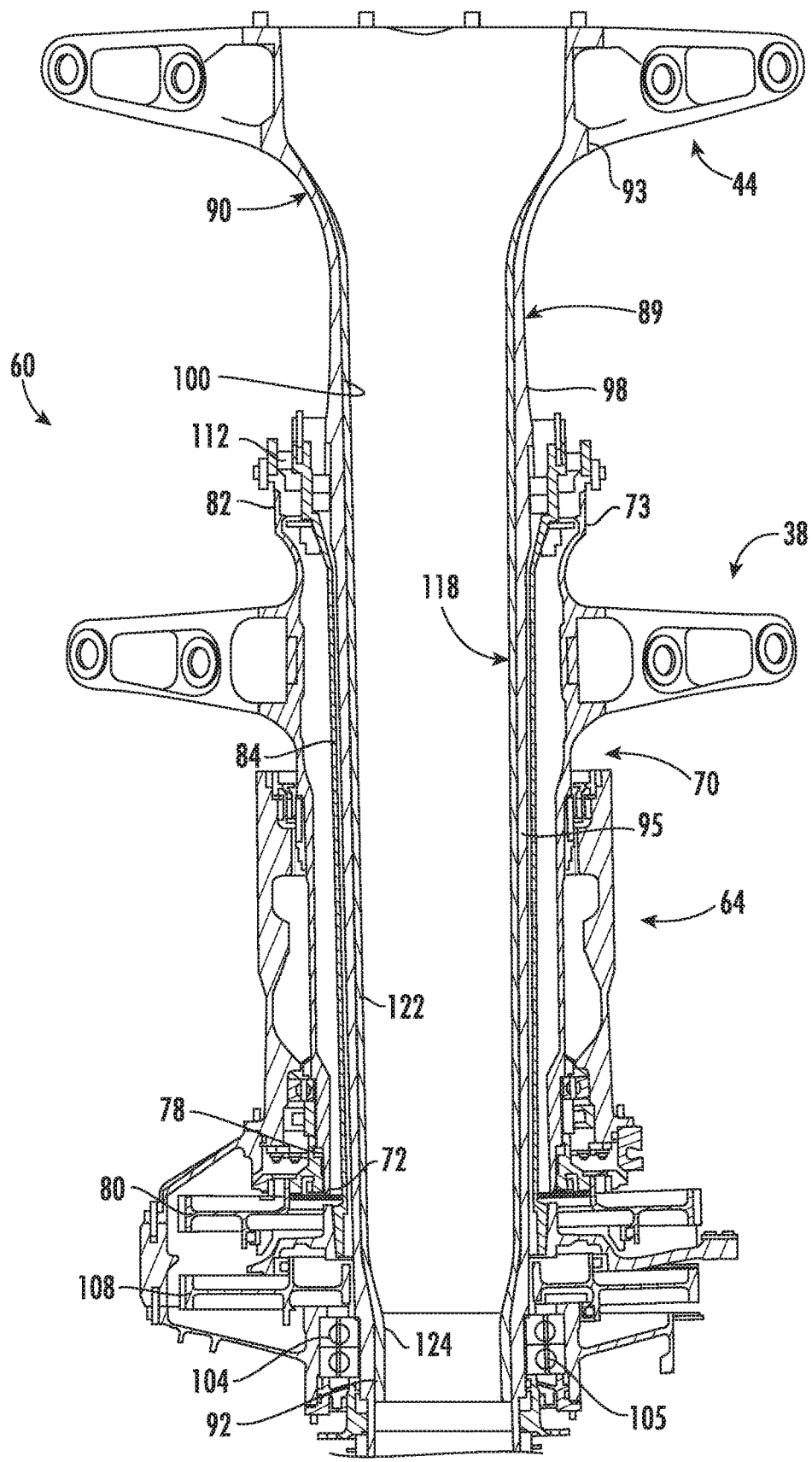
FIG. 2 is a partial cross-sectional view of the hybrid rotor shaft, in accordance with an exemplary embodiment.

In accordance with an exemplary embodiment, rotor system 18 is coupled to gearbox 26 through a rotor shaft assembly 60. Referring to FIG. 2, rotor shaft assembly 60 includes a stationary support 64 that is coupled to fuselage 12. Stationary support 64 houses a first rotor shaft 70 having a first end section 72 and a second end section 73. First end section 72 is supported by a bearing 78 to stationary support 64. A drive member 80, connected to gearbox 24, is mounted at first end section 72. Second end section 73 is connected to first rotor hub 38 and supported by bearing 82 to an inner stationary member 84.

Rotor shaft assembly 60 also includes a second rotor shaft 89 arranged radially inwardly of inner stationary member 84. Second rotor shaft 89 includes a body 90 having a first end 92, a second end 93 and an intermediate portion 95 extending therebetween. Body 90 may be formed from a first material, such as metal, and includes an outer surface 98 and an inner surface 100. First end 92 is supported to airframe 12 through a first bearing 104 and a second bearing 105. A second drive member 108 is connected to first end 92 axially outwardly of first bearing 104. A third bearing 112 rotatably supports second end 92 to inner stationary member 84. Second end 92 is operatively connected to second rotor hub 44. Body 90 is designed to meet selected strength parameters of second rotor shaft 89.

In accordance with an exemplary embodiment, second rotor shaft 89 includes a stiffness enhancing layer 118 that may extend from about first end 92 toward the second end 93 along inner surface 100. Stiffness enhancing layer 118 is formed from a material having a Young's Modulus equal to or greater than 16E6 psi (116 GPa). For example, stiffness enhancing layer 118 may be formed from graphite, boron and/or composites thereof. Stiffness enhancing layer 118 may include a first thickness 122 and a second thickness 124 that is distinct from first thickness 122. In this manner, stiffness enhancing layer 118 may include a non-uniform thickness. Changes in thickness may be positioned along selected points of second rotor shaft 89 in order to establish desired stiffness parameters. As shown, the stiffness enhancing layer 118 tapers and ends at approximately where a diameter of the body 90 increases closer to the second end 93.

In an embodiment, stiffness enhancing layer 118 may be formed and positioned to establish a uniform bending stiffness along a length of second rotor shaft 89. That is, stiffness enhancing layer 118 may be positioned and to provide a first portion (not separately labeled) of second rotor shaft 89 near first end 92 with a bending stiffness substantially similar to a second portion of second rotor shaft 89 near second end 93. In another embodiment, stiffness enhancing layer 118 may be designed such that second rotor shaft 89 has substantially the same bending stiffness as first rotor shaft 70, despite the difference in their respective diameters.

With this arrangement bending stiffness may be controlled and/or matched without adding to an overall weight of second rotor shaft 89 in an appreciable manner. Further, as body 90 is designed to meet strength requirements, any failure of stiffness enhancing layer 118, such as delamination, will not impact an overall operational efficacy of second rotor shaft 89. In addition, while described as forming part of a dual rotor system, it should be understood that the rotor shaft including a stiffness enhancing layer may be employed in single rotor aircraft.

In accordance with an exemplary embodiment, the stiffness enhancing layer 118 in accordance with exemplary embodiments, aligns aerodynamic and inertial load responses of first and second rotor assemblies 28 and 32 without increasing an overall weight of the rotor system 18. In addition to stiffness control that aligns aerodynamic and inertial response, stiffness enhancing layer increases an overall damage tolerance of rotor shaft assembly 60. The stiffness enhancing layer 118 may act as a crack arrestor that prevents crack expansion in the second rotor shaft 89. In this manner, the stiffness enhancing layer 118 increases an overall safety envelope for the aircraft 10.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value. It should also be understood that the phase "at least one of A and B" is meant to describe the disjunctive, not the conjunctive form. That is, "at least one of A or B" should be understood to mean A and/or B.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor shaft for a vertical take-off and landing (VTOL) aircraft having a rotor system, the rotor shaft comprising:
a body having a first end connectable to the rotor system, a second end, and an intermediate portion defining an outer surface and an inner surface extending between the first end and the second end, the body being formed from a first material; and
a stiffness enhancing layer applied to one of the outer surface and the inner surface, the stiffness enhancing layer comprising a second material other than the first material, the second material having a modulus of elasticity that is about 16E6 psi (116 GPa) or greater,
the stiffness enhancing layer disposed between a first position of the body and a second position of the body and tapering so as to terminate at the second position, the second position being at a region of the body having a larger diameter than at the first position, the region being proximate the first end.

2. The rotor shaft according to claim 1, wherein the first end defines a driven end of the rotor shaft.

3. The rotor shaft according to claim 2, wherein the stiffness enhancing layer extends from about the second end toward the first end along the intermediate portion.

4. The rotor shaft according to claim 3, wherein the stiffness enhancing layer extends from about the second end to about the first end.

5. The rotor shaft according to claim 1, wherein the stiffness enhancing layer is applied to the inner surface of the body.

6. The rotor shaft according to claim 1, wherein the stiffness enhancing layer comprises one of graphite and boron.

7. The rotor shaft according to claim 1, wherein the first end is supported by a first bearing and a second bearing, the stiffness enhancing layer extending along the inner surface between the first bearing and the second bearing.

8. The rotor shaft according to claim 1, wherein the stiffness enhancing layer includes a non-uniform thickness extending from the first end toward the second end.

9. The rotor shaft according to claim 1, wherein the stiffness enhancing layer is configured to act as a crack arrestor to prevent crack expansion.

10. A vertical take-off and landing (VTOL) aircraft comprising:
a fuselage;
a prime mover supported in the fuselage;
a gearbox connected to the prime mover;
a rotor system which rotates rotor blades about an axis; and
a rotor shaft assembly operatively connecting the rotor system and the gearbox, the rotor shaft assembly comprising:
a body having a first end connected to the rotor system, a second end, and an intermediate portion defining an outer surface and an inner surface extending between the first end and the second end, the body being formed from a first material; and
a stiffness enhancing layer applied to one of the outer surface and the inner surface, the stiffness enhancing layer comprising a second material other than the first material, the second material having a modulus of elasticity that is about 16E6 psi (116 GPa) or greater,
the stiffness enhancing layer disposed between a first position of the body and a second position of the body and tapering so as to terminate at the second position, the second position being at a region of the body having a larger diameter than at the first position, the region being proximate the first end.

11. The VTOL aircraft according to claim 10, wherein the first end defines a driven end of the rotor shaft.

12. The VTOL aircraft according to claim 11, wherein the stiffness enhancing layer extends from about the second end toward the first end along the intermediate portion.

13. The VTOL aircraft according to claim 12, wherein the stiffness enhancing layer extends from about the second end to about the first end.

14. The VTOL aircraft according to claim 10, wherein the stiffness enhancing layer is applied to the inner surface of the body.

15. The VTOL aircraft according to claim 10, wherein the stiffness enhancing layer comprises one of graphite and boron.

16. The VTOL aircraft according to claim 10, wherein the first end is supported by a first bearing and a second bearing, the stiffness enhancing layer extending along the inner surface between the first bearing and the second bearing.

17. The VTOL aircraft according to claim 10, wherein the stiffness enhancing layer includes a non-uniform thickness extending from the first end toward the second end.

18. The VTOL aircraft according to claim 10, wherein the rotor system comprises a dual rotor system including a first plurality of rotor blades connected to a first rotor hub and a second plurality of rotor blades connected to a second rotor hub arranged axially upwardly of the first rotor hub.

19. The VTOL aircraft according to claim 18, wherein the rotor shaft assembly is connected to the second rotor hub.

* * * * *